(12) United States Patent
Liu et al.

(10) Patent No.: US 11,745,402 B2
(45) Date of Patent: Sep. 5, 2023

(54) HIGH-PRECISION AND HIGH-EFFICIENCY INJECTION MOLD FOR HIGH-ASPECT-RATIO DOUBLE-LAYER CYLINDRICAL PLASTIC PART AND MOLDING METHOD USING THE SAME

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Ruikui Du, Taiyuan (CN); Guizhe Zhao, Taiyuan (CN); Kai Wen, Taiyuan (CN)

(73) Assignees: NORTH UNIVERSITY OF CHINA, Taiyuan (CN); SHANXI ZHONGBEI NEW MATERIAL TECHNOLOGY CO., LTD., Taiyuan (CN)

( * ) Notice: Subject to any disclaimer, the term of this patent is extended or adjusted under 35 U.S.C. 154(b) by 0 days.

(21) Appl. No.: 18/164,581

(22) Filed: Feb. 4, 2023

(65) Prior Publication Data
US 2023/0173723 A1 Jun. 8, 2023

(30) Foreign Application Priority Data
Jun. 23, 2022 (CN) .......................... 202210714970.2

(51) Int. Cl.
| B29C 45/26 | (2006.01) |
| --- | --- |
| B29C 45/16 | (2006.01) |
| B29C 45/73 | (2006.01) |
| B29L 9/00 | (2006.01) |

(52) U.S. Cl.
CPC ...... *B29C 45/2606* (2013.01); *B29C 45/1635* (2013.01); *B29C 45/2669* (2013.01); *B29C 45/7312* (2013.01); *B29L 2009/00* (2013.01)

(58) Field of Classification Search
CPC ........ B29C 45/1742; B29C 45/451775; B29C 45/2602; B29C 45/36; B29C 45/376
See application file for complete search history.

(56) References Cited

U.S. PATENT DOCUMENTS

2010/0001436 A1\* 1/2010 Axelsson .............. B29C 45/332
425/589

FOREIGN PATENT DOCUMENTS

| CN | 202826261 U | 3/2013 |
| CN | 104690911 A | 6/2015 |
| CN | 107932837 A | 4/2018 |

(Continued)

*Primary Examiner* — Kelly M Gambetta
*Assistant Examiner* — Virak Nguon

(57) ABSTRACT

An injection mold for a high-aspect-ratio double-layer cylindrical plastic part and a molding method using the same. The injection mold includes a support base plate. A movable mold fixing frame and a movable mold base plate are arranged at the middle of a lower surface of the support base plate through positioning screws. A lower core mold is matchingly provided at a center of an upper surface of the support base plate, and is provided with a lower semicircular cavity for accommodating an outer die barrel. One side of the lower semicircular cavity is open, and the other side is provided with a first end wall which is provided with a lower semicircular notch for an inner die rod to pass through. An upper surface of the lower core mold is provided with a positioning protrusion, a lower feeding groove, and a remaining groove.

9 Claims, 8 Drawing Sheets

(56) References Cited

FOREIGN PATENT DOCUMENTS

| | | | | |
|---|---|---|---|---|
| CN | 207273752 | U | | 4/2018 |
| CN | 109849274 | A | | 6/2019 |
| CN | 210705825 | U | * | 6/2020 |
| CN | 210705825 | U | | 6/2020 |
| CN | 112223679 | A | | 1/2021 |
| CN | 214872383 | U | | 11/2021 |
| JP | 2001088172 | A | | 4/2001 |
| JP | 2007203551 | A | * | 8/2007 |
| JP | 2007203551 | A | | 8/2007 |

* cited by examiner

HIGH-PRECISION AND HIGH-EFFICIENCY INJECTION MOLD FOR HIGH-ASPECT-RATIO DOUBLE-LAYER CYLINDRICAL PLASTIC PART AND MOLDING METHOD USING THE SAME

CROSS-REFERENCE TO RELATED APPLICATIONS

This application claims the benefit of priority from Chinese Patent Application No. 202210714970.2, filed on Jun. 23, 2022. The content of the aforementioned application, including any intervening amendments thereto, is incorporated herein by reference.

TECHNICAL FIELD

The present application relates to plastic-formed mold, and more particularly to a high-precision and high-efficiency injection mold for a high-aspect-ratio double-layer cylindrical plastic part and a molding method using the same.

BACKGROUND

Injection molds are used for the injection molding of thermoplastic products. In injection molding process, a plastic material is heated and melted in a heating barrel of the injection molding machine, and then pushed by a screw or plunger into a mold cavity through a nozzle and a gating system, and solidified and shaped in the mold cavity to obtain a thermoplastic product. Regarding the existing injection molds made in China, the optimal precision can reach 2 μm. However, it is still required to import those particularly complex and advanced high-end molds. With the development of society, higher and higher requirements are put forward for plastic articles, and thus it is urgent to optimize the injection molds in precision, service life, and efficiency. With respect to the molding of high-aspect-ratio double-layer cylindrical plastic parts, the conventional injection molds have the following problems: (1) for a double-core structure, it is difficult to complete demolding; and (2) the high-aspect-ratio double-layer cylindrical plastic part is prone to deformation during the demolding process.

SUMMARY

An object of this disclosure is to provide an injection mold for a high-aspect-ratio double-layer cylindrical plastic part and a molding method using the same to overcome the defects in the conventional molds, such as poor melt filling and difficult demolding.

The technical solutions of this application are described as follows.

In a first aspect, this application provides a high-precision and high-efficiency injection mold for a high-aspect-ratio double-layer cylindrical plastic part, comprising:

a support base plate;

wherein a movable mold fixing frame and a movable mold base plate are successively arranged at a middle of a lower surface of the support base plate through positioning screws; a lower core mold accommodating cavity is provided at a center of a top surface of the support base plate; a lower core mold is provided in the lower core mold accommodating cavity, and fits the lower core mold accommodating cavity; the lower core mold is provided with a lower semicircular cavity for matchingly accommodating an outer die barrel; a first side of the lower semicircular cavity is open, and a second side of the lower semicircular cavity is provided with a first end wall; the first end wall is provided with a lower semicircular notch for fitting an inner die rod; an upper surface of the lower core mold is provided with a positioning protrusion, a lower feeding groove, and a remaining groove; a push plate is arranged in the movable mold fixing frame; a reset guide rod and a push rod are fixedly arranged on the push plate; the push rod penetrates the lower core mold to enter the remaining groove; the reset guide rod penetrates the support base plate; and the movable mold base plate is provided with a push plate hole;

a stationary mold plate is arranged above a middle of the support base plate; an upper core mold accommodating cavity is provided at a center of a lower surface of the stationary mold plate; an upper core mold is provided in the upper core mold accommodating cavity, and fits the upper core mold accommodating cavity; the upper core mold is provided with an upper semicircular cavity for matchingly accommodating the outer die barrel; a first side of the upper semicircular cavity is open, and a second side of the upper semicircular cavity is provided with a second end wall; the second end wall is provided with an upper semicircular notch for fitting the inner die rod; a lower surface of the upper core mold is provided with a positioning groove and an upper feeding groove; the upper feeding groove is connected to a branch runner; the branch runner penetrates through the stationary mold plate; a stationary mold base plate is arranged on an upper surface of the stationary mold plate; the stationary mold base plate is provided with a pouring port, and a hot runner bushing is arranged in the pouring port; a bottom end of the hot runner bushing is connected to an inlet of a primary runner on the upper surface of the stationary mold plate; the stationary mold base plate is provided with a guide pillar; and the guide pillar penetrates through the stationary mold plate and the support base plate in sequence; and after the lower core mold and the upper core mold are clamped, the lower feeding groove and the upper feeding groove together form a feeding channel, the lower semicircular cavity and the upper semicircular cavity together form a circular cavity, the first end wall and the second end wall together form an end wall at a first side of the circular cavity, and the lower semicircular notch and the upper semicircular notch together form a circular hole for the inner die rod to pass through; a positioning block is arranged at a second side of the circular cavity, and is fixed on the support base plate; a height of an inner ring surface of the positioning block protruding from a side wall surface of the circular cavity is less than or equal to a thickness of a molded plastic part; the inner ring surface of the positioning block is in clearance fit with an outer surface of the outer die barrel; a first fixed seat is arranged at a first end of the support base plate; a first moving device is arranged on the first fixed seat; a first pull rod is arranged at a moving end of the first moving device, and is connected to an end of the outer die barrel through a first mounting block; a second fixed seat is arranged at a second end of the support base plate; a second moving device is arranged on the second fixed seat; and a second pull rod is arranged at a moving end of the second moving device, and is connected to an end of the inner die rod through a second mounting block.

In an embodiment, during operation, after the upper core mold and the lower core mold are clamped, the stationary mold plate and the support base plate are in a closed state, and the outer die barrel and the inner die rod are located in the circular cavity. The molten plastic is injected into the molding space of the outer barrel and the inner bar through the pouring port of the stationary mold base plate to form a double-layer cylinder plastic part. After the support base plate moves downward to open the mold, the double-layer cylinder plastic part is located in the lower core mold. The first moving device pulls the outer barrel out of the double-layer cylinder plastic part under the action of the first pull rod and the first mounting block, and the inner ring surface of the positioning block prevents the double-layer cylinder plastic part from being pulled out together. At the same time, the second moving device pulls the inner die rod out of the double-layer barrel under the action of the second pull rod and the second mounting block. Then, the push plate moves upward under the action of the external top bar, and pushes the excess plastic parts in the remaining groove through the push bar, so as to push the double-layer barrel out of the lower core mold and complete the injection molding after taking out the double-layer barrel. After that, the outer die barrel and inner die rod are reset, the support base plate is reset under the action of the guide bar to fit the stationary mold plate to stop, and the upper core mold and lower core mold are re-molded (the outer die barrel and inner die rod are located in the circular cavity again), while the push plate is reset under the action of the reset guide bar for the next injection molding.

In an embodiment, a first guide sleeve is provided in a guide pillar hole of the stationary mold plate; and a second guide sleeve is provided in a guide pillar hole of the support base plate.

In an embodiment, the stationary mold plate is provided with a first cooling water channel for cooling the upper core mold; and the support base plate is provided with a second cooling water channel for transportation of water to cool the lower core mold. After the injection molding, the plastic parts can be shaped quickly through water cooling.

In an embodiment, after the stationary mold plate is clamped with the support base plate, the first mounting block and the second mounting block are fitly located in the stationary mold plate to ensure the accuracy of the mold closing.

In an embodiment, a height of an inner ring surface of the positioning block protruding from a wall surface of the circular cavity is less than or equal to a thickness of a molded plastic part.

In a second aspect, this application provides a high-precision and high-efficient molding method for a high-aspect-ratio double-layer cylindrical plastic part by using the above-mentioned injection mold, comprising:

subjecting a thermoplastic to shearing and melting by using an injection molding machine to produce a molten plastic;

allowing the molten plastic to pass through a hot nozzle of a hot runner system to enter the pouring port of the stationary mold base plate, the primary runner through the hot runner bushing, the branch runner, the feeding groove, and the circular cavity successively, so as to fill a space formed by the outer die barrel and the inner die rod to produce a preformed plastic part, wherein gas in the circular cavity (namely, mold cavity) is discharged through a gap between the upper core mold and the lower core mold;

shaping the preformed part to produce the molded plastic part;

driving, by the injection molding machine, the movable mold base plate to pull the movable mold fixing frame and the support base plate to move downward, wherein the support base plate is moved downward under the limitation of the guide pillar to allow a mold to be opened from a parting surface; after a movable mold portion moves a certain distance since adhesion force between the molded plastic part and the upper core mold is far less than a packaging force between the molded plastic part and the lower core mold, the molded plastic part is left on the lower core mold;

driving, by the first moving device, the first pull rod to pull out the outer die barrel through the first mounting block, wherein the molded plastic part is blocked by the inner ring surface of the positioning block from being pulled out by the outer die barrel;

driving, by the second moving device, the second pull rod to pull out the inner die rod through the second mounting block; wherein a secondary opening distance is required to be at least 10 mm larger than twice a diameter of the molded plastic part to enable smooth removal; and an opening distance is controlled by the injection molding machine;

driving, by a driving rod of the injection molding machine, the push plate to move upward through the push plate hole to allow the push rod to move upward accordingly, so as to remove excess plastic in the remaining groove and push the molded plastic part away from the lower core mold, and allow the reset guide bar on the push plate to extend out of the support base plate to complete an injection molding;

driving, by the first moving device, the outer die barrel to reset;

driving, by the second moving device, the inner die rod to reset; and driving, by the injection molding machine, the support base plate to reset and fit with the stationary mold plate through the movable mold base plate under an action of the guide pillar; and at the same time, pushing, by the reset guide rod, the push plate to an original position to complete clamping between the upper core mold and the lower core mold for next injection molding.

Compared with the prior art, this application has the following beneficial effects.

(1) Through the dual-core pulling structure, the high-aspect-ratio double-layer cylindrical plastic part can be molded.

(2) By means of the inner ring surface of the positioning block, the molded plastic part will not be pulled out together with the outer core pulling structure during the guided reset process.

(3) In this application, cooling water pipes are provided in the moving core mold and the stationary core mold, which can effectively shorten the cooling time of the molded plastic parts, so as to improve production efficiency.

The injection mold provided herein is reasonably designed and has good practical application potential.

Figure 1:
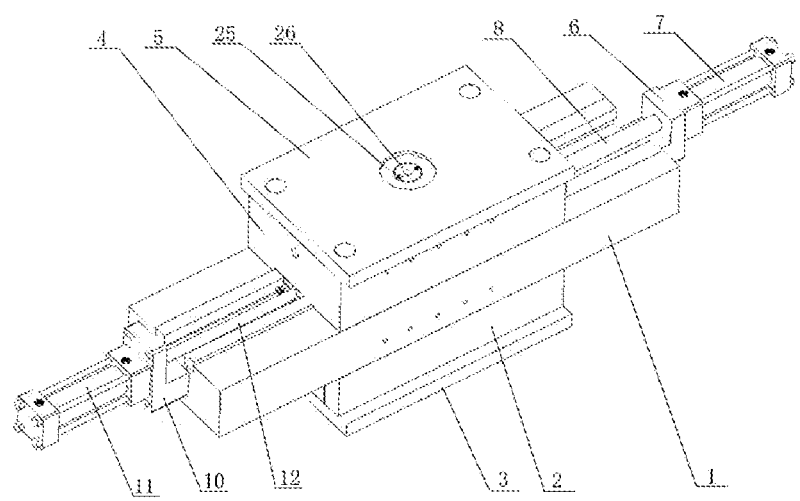
FIG. 1 schematically shows an overall structure of an injection mold according to an embodiment of the present disclosure.

In the drawings, 1, support base plate; 2, movable mold fixing frame; 3, movable mold base plate; 4, stationary mold plate; 5, stationary mold base plate; 6, first fixed seat; 7, first moving device; 8, first pull rod; 9, first mounting block; 10, second fixed seat; 11, second moving device; 12, second pull rod; 13, second mounting block; 14, lower core mold; 15, upper core mold; 16, push plate; 17, reset guide rod; 18, push rod; 19, push plate hole; 20, outer die barrel; 21, inner die rod; 22, guide pillar; 23, first guide sleeve; 24, second guide sleeve; 25, pouring port; 26, hot runner bushing; 27, primary runner; 28, branch runner; 29, positioning block; 30, molded plastic part; 31, positioning screw; 32, limit screw; 141, lower semicircular cavity; 142, first end wall; 143, lower semicircular notch; 144, positioning protrusion; 145, lower feeding groove; 146, remaining groove; 151, upper semicircular cavity; 152, second end wall; 153, upper semicircular notch; 154, positioning groove; and 155, upper feeding groove.

DETAILED DESCRIPTION OF EMBODIMENTS

The technical solutions of the present application will be clearly and completely described below with reference to the drawings and embodiments. Obviously, described below are only some embodiments of the present application, which are not intended to limit the present application.

Provided herein is a high-precision and high-efficiency injection mold for a high-aspect-ratio double-layer cylindrical plastic part. As shown in FIG. 1, the injection mold includes a support base plate 1, a movable mold fixing frame 2, a movable mold base plate 3, a stationary mold plate 4, a stationary mold base plate 5, a first fixed seat 6, a first moving device 7, a first pull rod 8, a first mounting block 9, a second fixed seat 10, a second moving device 11, a second pull rod 12, a second mounting block 13, a lower core mold 14, and an upper core mold 15.

As shown in FIGS. 1, 5, 7, 8 and 9, the movable mold fixing frame 2 and the movable mold base plate 3 are fixedly connected through a plurality of limit screws 32, and then arranged on a middle of a lower surface of the support base plate 1 through a plurality of positioning screws 31.

Figure 3:
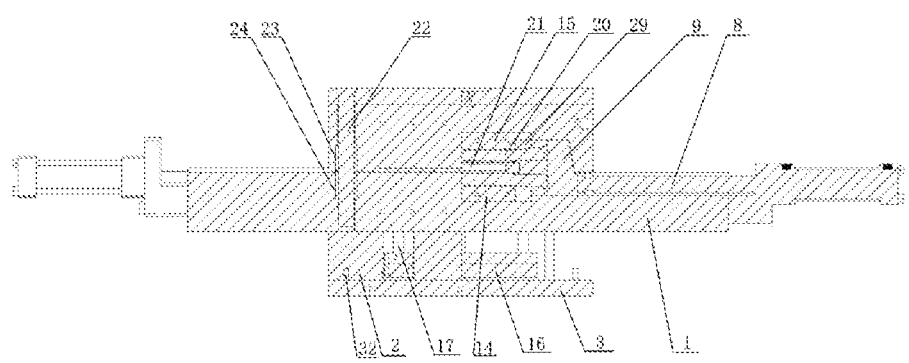
FIG. 3 is a sectional view of FIG. 2 along A-A line.
Figure 4:
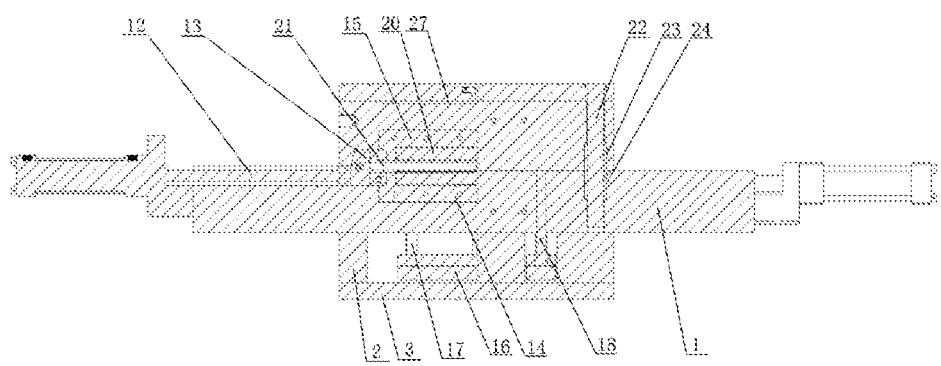
FIG. 4 is a sectional view of FIG. 2 along B-B line.
Figure 12:
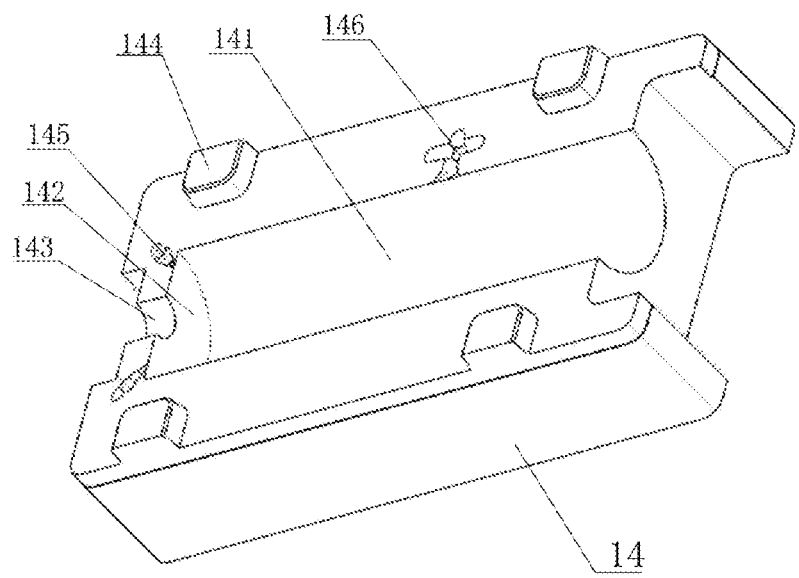
FIG. 12 structurally shows a lower core mold according to an embodiment of the present disclosure.

As shown in FIGS. 3 and 4, a lower core mold accommodating cavity is provided at a center of a top surface of the support base plate 1, and a lower core mold 14 is provided in the lower core mold accommodating cavity by screws, and fits the lower core mold accommodating cavity. As shown in FIG. 12, the lower core mold 14 is provided with a lower semicircular cavity 141 for matchingly accommodating an outer die barrel 20. A first side of the lower semicircular cavity 141 is open, and a second side of the lower semicircular cavity 141 is provided with a first end wall 142. The first end wall 142 is provided with a lower semicircular notch 143 for fitting an inner die rod 21. An upper surface of the lower core mold 14 is symmetrically provided with four positioning protrusions 144, two lower feeding grooves 145, and a remaining groove 146.

Figure 5:
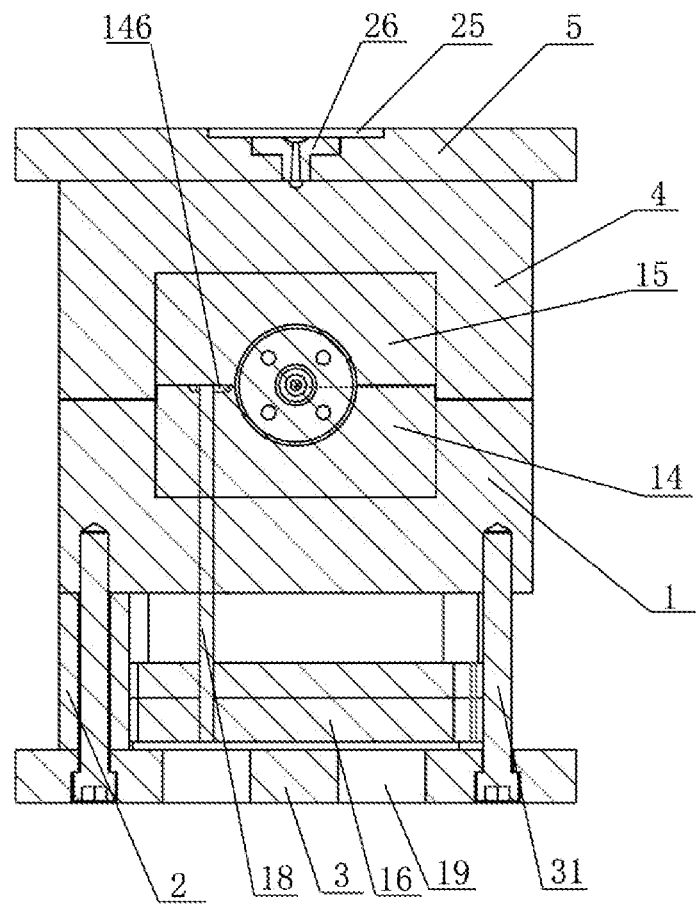
FIG. 5 is a sectional view of FIG. 2 along C-C line.
Figure 6:
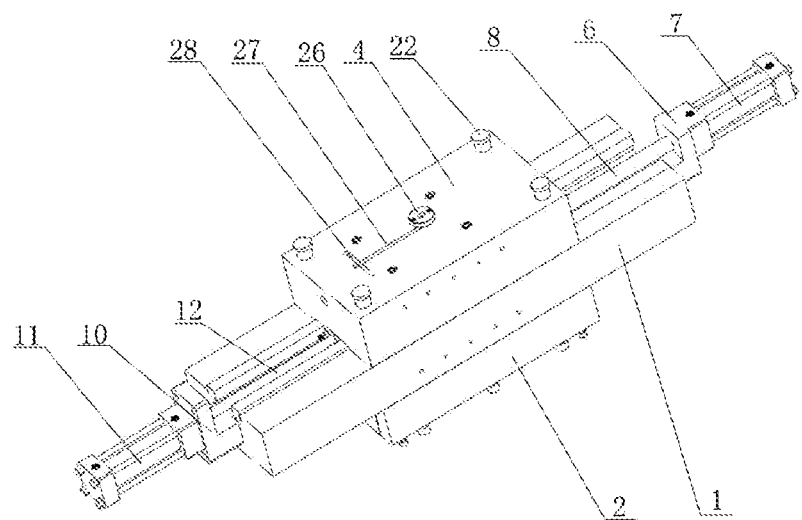
FIG. 6 schematically shows the sprue arrangement on a stationary mold plate in the injection mold according to an embodiment of the present disclosure.
Figure 8:
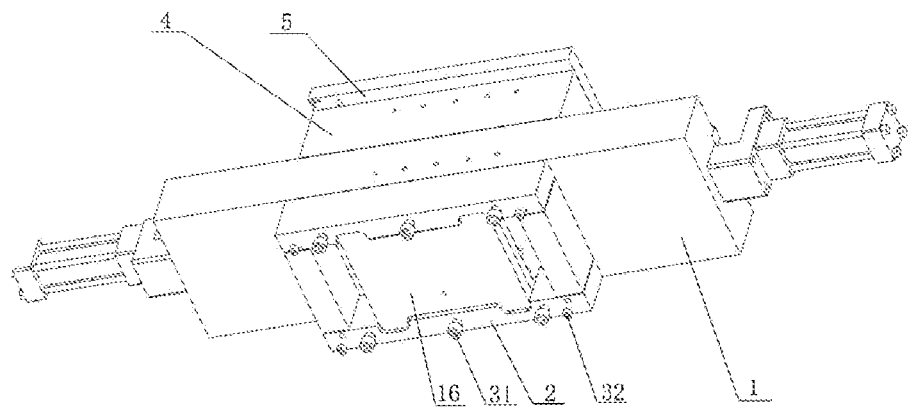
FIG. 8 is a bottom view of the injection mold according to an embodiment of the present disclosure with a movable mold base plate removed.
Figure 9:
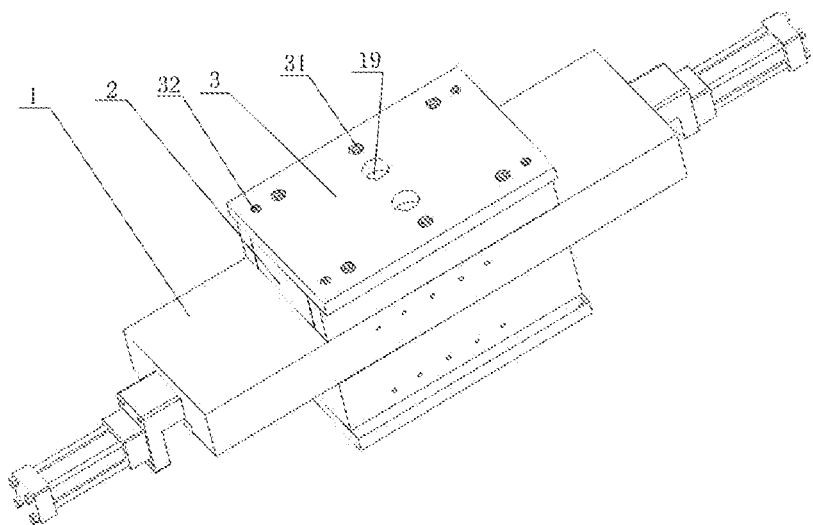
FIG. 9 shows a bottom structure of the injection mold according to an embodiment of the present disclosure.
Figure 10:
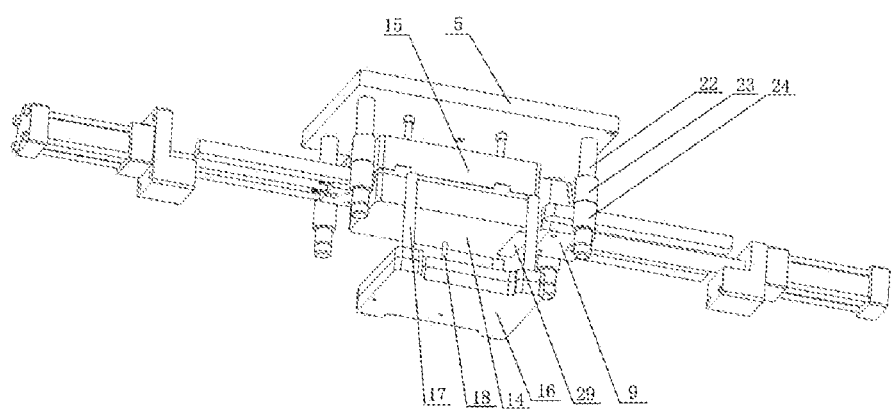
FIG. 10 shows a bottom view of the internal structure of the injection mold according to an embodiment of the present disclosure.
Figure 11:
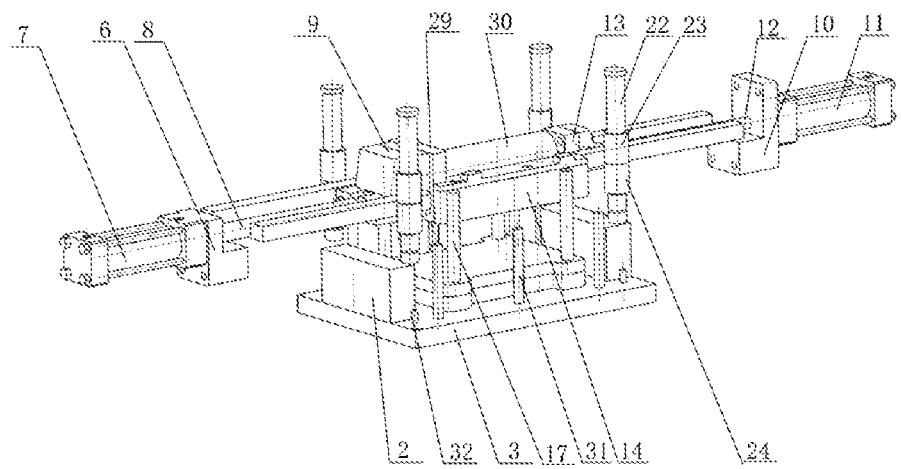
FIG. 11 shows a structure of the injection mold according to an embodiment of the present disclosure with an upper core mold removed.
Figure 13:
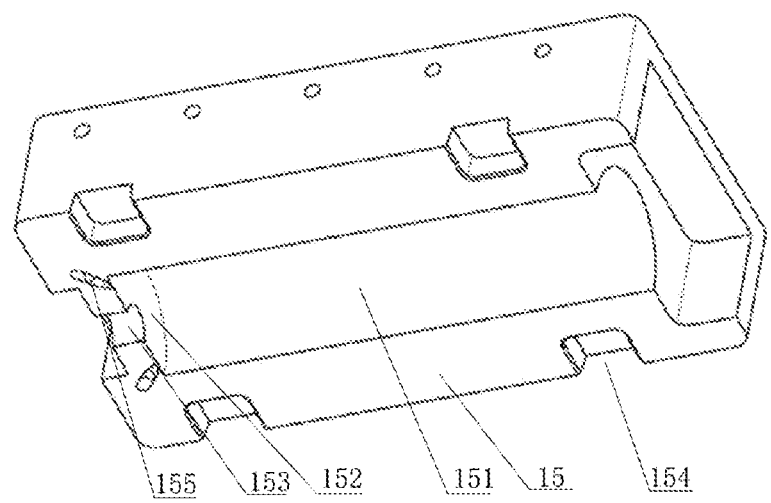
FIG. 13 structurally shows the upper core mold according to an embodiment of the present disclosure.

As shown in FIGS. 8, 10 and 11, a push plate 16 is arranged in the movable mold fixing frame 2 in a sliding manner, and a sliding distance of the push plate 16 depends on a height of the movable mold fixing frame 2. Four reset guide rods 17 and one push rod 18 are fixedly arranged on the push plate 16. The push rod 18 penetrates the lower core mold 14 to enter the remaining groove 146, and all the four reset guide rods 17 penetrate the support base plate 1. As shown in FIG. 9, the movable mold base plate 3 is provided with two push plate holes 19. As shown in FIGS. 3, 4, 5 and 6, the stationary mold plate 4 is arranged above a middle of the support base plate 1. An upper core mold accommodating cavity is provided at a center of a lower surface of the stationary mold plate 4, and an upper core mold 15 is fixedly arranged in the upper core mold accommodating cavity by screws, and fits the upper core mold accommodating cavity. As shown in FIG. 13, the upper core mold 15 is provided with an upper semicircular cavity 151 for matchingly accommodating the outer die barrel 20. A first side of the upper semicircular cavity 151 is open, and a second side of the upper semicircular cavity 151 is provided with a second end wall 152. The second end wall 152 is provided with an upper semicircular notch 153 for fitting the inner die rod 21. A lower surface of the upper core mold 15 is provided with four positioning grooves 154 and two upper feeding grooves 155. The two upper feeding grooves 155 are connected to a branch runner 28. The branch runner 28 penetrates to the surface of the stationary mold plate 4. As shown in FIG. 6, the center of the upper surface of the stationary mold plate 4 is provided with a primary runner 27, which extends and then is divided to form two branch runners 28. Each of the two branch runners 28 is connected to an upper feeding groove 155 through its respective vertical runner penetrating through the upper core mold 15 to the surface of the stationary mold plate 4.

Figure 2:
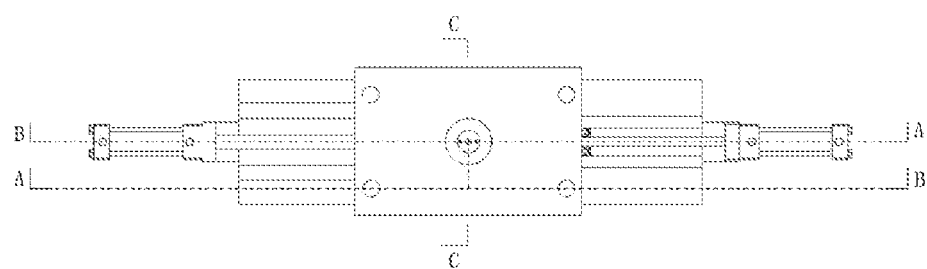
FIG. 2 is a top view of the injection mold according to an embodiment of the present disclosure.

As shown in FIG. 1, the stationary mold base plate 5 is fixedly arranged on the upper surface of the stationary mold plate 4 through guide pillar 22. As shown in FIGS. 2 and 5, the stationary mold base plate 5 is provided with a pouring port 25, and a hot runner bushing 26 is fixedly arranged in the pouring port 25 by screws. A bottom end of the hot runner bushing 26 is connected to an inlet of the primary runner 27 on the upper surface of the stationary mold plate 4. As shown in FIG. 10, the stationary mold base plate 5 is symmetrically provided with four guide pillars 22 running through the stationary mold plate 4 and the support base plate 1 successively. As shown in FIGS. 3, 4, 7 and 11, a first guide sleeve 23 is installed in a guide pillar hole of the stationary mold plate 4, and a second guide sleeve 24 is installed in a guide pillar hole of the support base plate 1.

Figure 7:
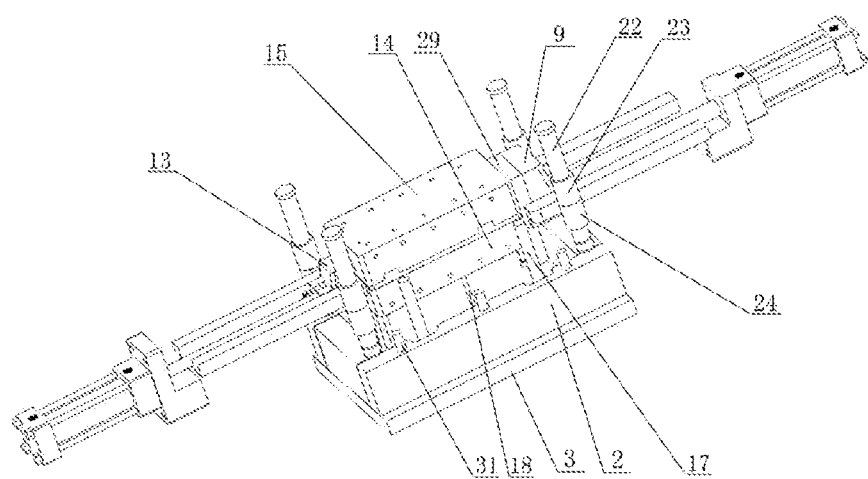
FIG. 7 is a top view of an internal structure of the injection mold according to an embodiment of the present disclosure.

As shown in FIGS. 7 and 10, after the lower core mold 14 and the upper core mold 15 are clamped, the lower feeding groove 145 and the upper feeding groove 155 together form a feeding channel, the upper semicircular cavity 151 and the lower semicircular cavity 141 together form a circular cavity, the first end wall 142 and the second end wall 152 together form an end wall at a first side of the circular cavity, and the lower semicircular notch 143 and the upper semicircular notch 153 together form a circular hole for the inner die rod 21 to pass through. A positioning block 29 is arranged at a second side of the circular cavity, and is fixed on the support base plate 1. An inner ring surface of the positioning block 29 is in clearance fit with an outer surface of the outer die barrel 20. For example, the thickness of the inner ring surface of the positioning block 29 protruding from a side wall surface of the circular cavity is less than or equal to the thickness of a molded plastic part 30. The positioning block 29 is configured to block the molded plastic part 30 from being withdrawn with the outer die barrel 20 during the withdrawal process of the outer die barrel 20 by using the protruding inner ring surface. As shown in FIGS. 1, 3, 4, 7 and 11, the first fixed seat 6 is arranged at the right (close to this side of the molded plastic part) end of the support base plate 1, and the first moving device 7 is arranged on the first fixed seat 6. The first pull rod 8 is arranged at a moving end of the first moving device 7 and is connected to an end of the outer die barrel 20 through the first mounting block 9 for pulling the outer die barrel 20. The second fixed seat 10 is arranged at the left end of the support base plate 1, and the second moving device 11 is arranged on the second fixed seat 10. The second pull rod 12 is arranged at a moving end of the second moving device 11 and is connected to an end of the inner die rod 21 through the second mounting block 13 for pulling the inner die rod 21. The first moving device 7 and the second moving device 11 are a cylinder or oil cylinder.

As shown in FIGS. 3 and 4, after the stationary mold plate 4 is clamped with the support base plate 1, the first mounting block 9 and the second mounting block 13 are matchingly located in the stationary mold plate 4. The left and right sides of the lower core mold 14 and the upper core mold 15 are provided with slots for placing the second mounting block 13 and the first mounting block 9, respectively, to achieve assembly positioning, and ensure the molding accuracy of the plastic parts.

The stationary mold plate 4 is provided with a first cooling water channel for cooling the upper core mold 15. The support base plate 1 is provided with a second cooling water channel for transportation of water to cool the lower core mold 14.

Figure 14:
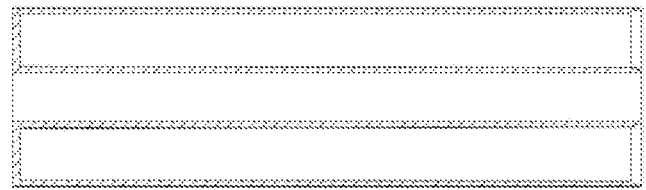
FIG. 14 is a sectional view of a molded plastic part according to an embodiment of the present disclosure.

As shown in FIG. 14, the injection molding of a high-aspect-ratio double-layer cylindrical plastic part requires cooperation between the outer die barrel 20 (outer core extraction) and the inner die rod 21 (inner core extraction).

A molding method of a thermoplastic double-layer cylindrical part by using the above-mentioned injection mold is also provided in this application, which is described specifically below.

A thermoplastic is sheared and molten by using an injection molding machine to produce a molten plastic. The molten plastic passes through a nozzle of a hot runner system, enters the pouring port 25 of the stationary mold base plate 5, and then enters the primary runner 27 of the stationary mold plate 4 through the hot runner bushing 26. Then, the molten plastic passes through the stationary mold plate 4 and the upper core mold 15 through the branch runner and vertical runner to enter the feeding groove and immediately enter the circular cavity (namely, mold cavity) formed between the lower core mold 14 and the upper core mold 15, so as to fill the space formed by the outer die barrel 20 and the inner die rod 21 to produce a preformed plastic part, where the gas in the mold cavity is discharged through the gap between the upper core mold 15 and the lower core mold 14. The cooling water is fed into the cooling water channels of the stationary mold plate 4 and the supporting plate 1 for cooling and shaping. After the injection molding is completed and the cylindrical plastic part is formed, the injection molding machine drives the movable mold base plate 3 to pull the movable mold fixing frame 2 and the support base plate 1 to move downward (the stationary mold plate 4 is fixed), that is, the support base plate 1 moves downward under the limitation of the four guide pillars 22 to open the mold from the parting surface, and the movable mold portion continues to move downward under the action of the injection molding machine. After the movable mold portion moves a certain distance, the molded plastic part 30 is left on the lower core mold 14 since the adhesion force between the molded plastic part 30 and the upper core mold 15 is much smaller than a packaging force between the molded plastic part 30 and the lower core mold 14. The first cylinder (the first moving device 7) drives the first pull rod 8 to pull out the outer die barrel 20 through the first mounting block 9, and the molded plastic part 30 is blocked by the inner ring surface of the positioning block 29 from being pulled out by the outer die barrel 20. The second cylinder (the second moving device 11) drives the second pull rod 12 to pull out the inner die rod 21 through the second mounting block 13. To smoothly take the molded plastic part 30 out, a secondary opening distance is required to be at least 10 mm larger than twice a diameter of the molded plastic part 30. The mold opening distance is controlled by the injection molding machine. After the mold opening stroke is completed, the driving rod of the injection molding machine drives the push plate 16 to move upward through the push plate hole 19, and the push rod 18 moves upward accordingly. Since the remaining groove 146 on the lower core mold 14 is connected to the mold cavity, there will be some excess plastic in the remaining groove 146. The push rod 18 pushes away the excess plastic, pushes the molded plastic part 30 away from the lower core mold 14, and allows the four reset guide bars 17 on the push plate 16 to extend out of the support base plate 1 to complete an injection molding. After that, the first cylinder drives the outer die barrel 20 to reset, the second cylinder drives the inner die rod 21 to reset, and the injection molding machine drives the support base plate 1 to reset and fit with the stationary mold plate 4 through the movable mold base plate 3 under the action of the four guide pillars 22. At the same time, the push plate 16 is pushed back to the original position and reset under the action of four reset guide rods 17. Finally, the upper core mold 15 and the lower core mold 14 are clamped together for the next injection.

The injection mold provided herein utilizes double extraction cores to achieve the molding of large-aspect-ratio double-layer plastic parts, and adopts positioning rings to ensure the guide recovery of the outer extraction core. In addition, by providing cooling water pipes inside the moving core and the fixed core, the cooling time of the plastic parts is effectively reduced, thus improving production efficiency.

It is apparent to those skilled in the art that the present disclosure is not limited to the above exemplary embodiments, and can be implemented in other specific forms without departing from the spirit or essential features of the present disclosure. It should be understood that any modifications, changes and replacements made by those skilled in the art without departing from the spirit of the disclosure shall fall within the scope of the disclosure defined by the appended claims.

What is claimed is:

1. An injection mold for a high-aspect-ratio double-layer cylindrical plastic part, comprising:
   a support base plate;
   wherein a movable mold fixing frame and a movable mold base plate are successively arranged at a middle of a lower surface of the support base plate through positioning screws; a lower core mold accommodating cavity is provided at a center of a top surface of the support base plate; a lower core mold is provided in the lower core mold accommodating cavity, and fits the lower core mold accommodating cavity; the lower core mold is provided with a lower semicircular cavity for matchingly accommodating an outer die barrel; a first side of the lower semicircular cavity is open, and a second side of the lower semicircular cavity is provided with a first end wall; the first end wall is provided with a lower semicircular notch for fitting an inner die rod; an upper surface of the lower core mold is provided with a positioning protrusion, a lower feeding groove, and a remaining groove; a push plate is arranged in the movable mold fixing frame; at least one reset guide rod and a push rod are fixedly arranged on the push plate; the push rod penetrates the lower core mold to enter the remaining groove; the at least one reset guide rod penetrates the support base plate; and the movable mold base plate is provided with a push plate hole;

a stationary mold plate is arranged above a middle of the support base plate; an upper core mold accommodating cavity is provided at a center of a lower surface of the stationary mold plate; an upper core mold is provided in the upper core mold accommodating cavity, and fits the upper core mold accommodating cavity; the upper core mold is provided with an upper semicircular cavity for matchingly accommodating the outer die barrel; a first side of the upper semicircular cavity is open, and a second side of the upper semicircular cavity is provided with a second end wall; the second end wall is provided with an upper semicircular notch for fitting the inner die rod; a lower surface of the upper core mold is provided with a positioning groove and an upper feeding groove; the upper feeding groove is connected to a branch runner; the branch runner penetrates to a surface of the stationary mold plate; a stationary mold base plate is arranged on an upper surface of the stationary mold plate; the stationary mold base plate is provided with a pouring port, and a hot runner bushing is arranged in the pouring port; a bottom end of the hot runner bushing is connected to an inlet of a primary runner on the upper surface of the stationary mold plate; the stationary mold base plate is provided with at least one guide pillar; and the at least one guide pillar penetrates through the stationary mold plate and the support base plate in sequence; and after the lower core mold and the upper core mold are clamped, the lower feeding groove and the upper feeding groove together form a feeding channel, the lower semicircular cavity and the upper semicircular cavity together form a circular cavity, the first end wall and the second end wall together form an end wall at a first side of the circular cavity, and the lower semicircular notch and the upper semicircular notch together form a circular hole for the inner die rod to pass through; a positioning block is arranged at a second side of the circular cavity, and is fixed on the support base plate; a height of an inner ring surface of the positioning block protruding from a side wall surface of the circular cavity is less than or equal to a thickness of a molded plastic part; the inner ring surface of the positioning block is in clearance fit with an outer surface of the outer die barrel; a first fixed seat is arranged at a first end of the support base plate; a first moving device is arranged on the first fixed seat; a first pull rod is arranged at a moving end of the first moving device, and is connected to an end of the outer die barrel through a first mounting block; a second fixed seat is arranged at a second end of the support base plate; a second moving device is arranged on the second fixed seat; and a second pull rod is arranged at a moving end of the second moving device, and is connected to an end of the inner die rod through a second mounting block.

2. The injection mold of claim 1, wherein a first guide sleeve is provided in a guide pillar hole of the stationary mold plate; and a second guide sleeve is provided in a guide pillar hole of the support base plate.

3. The injection mold of claim 2, wherein the stationary mold plate is provided with a first cooling water channel for transportation of water to cool the upper core mold; and the support base plate is provided with a second cooling water channel for transportation of water to cool the lower core mold.

4. The injection mold of claim 3, wherein after the stationary mold plate is clamped with the support base plate, the first mounting block and the second mounting block are fitly located in the stationary mold plate.

5. The injection mold of claim 1, wherein the movable mold fixing frame and the movable mold base plate are connected through a limit screw.

6. The injection mold of claim 1, wherein the primary runner is connected with two branch runners.

7. The injection mold of claim 1, wherein the number of the at least one reset guide rod is four, and the four reset guide rods are evenly distributed on the push plate.

8. The injection mold of claim 1, wherein the number of the at least one guide pillar is four, and the four guide pillars are evenly distributed on the stationary mold base plate.

9. A method for molding a double-layer cylindrical plastic part by using the injection mold of claim 1, comprising:
subjecting a thermoplastic to shearing and melting by using an injection molding machine to produce a molten plastic;
allowing the molten plastic to pass through a nozzle of a hot runner system to enter the pouring port of the stationary mold base plate, the primary runner through the hot runner bushing, the branch runner, the feeding groove, and the circular cavity successively, so as to fill a space formed by the outer die barrel and the inner die rod to produce a preformed plastic part, wherein gas in the circular cavity is discharged through a gap between the upper core mold and the lower core mold;
shaping the preformed part to produce the molded plastic part;
driving, by the injection molding machine, the movable mold base plate to pull the movable mold fixing frame and the support base plate to move downward, wherein the support base plate is moved downward under the limitation of the at least one guide pillar to allow a mold to be opened from a parting surface; after a movable mold portion moves a certain distance, since adhesion force between the molded plastic part and the upper core mold is far less than a packaging force between the molded plastic part and the lower core mold, the molded plastic part is left on the lower core mold;
driving, by the first moving device, the first pull rod to pull out the outer die barrel through the first mounting block, wherein the molded plastic part is blocked by the inner ring surface of the positioning block from being pulled out by the outer die barrel;

driving, by the second moving device, the second pull rod to pull out the inner die rod through the second mounting block; wherein a secondary opening distance is required to be at least 10 mm larger than twice a diameter of the molded plastic part to enable smooth removal; and an opening distance is controlled by the injection molding machine;

driving, by a driving rod of the injection molding machine, the push plate to move upward through the push plate hole to allow the push rod to move upward accordingly, so as to remove excess plastic in the remaining groove and push the molded plastic part away from the lower core mold, and allow the reset guide bar on the push plate to extend out of the support base plate to complete an injection molding;

driving, by the first moving device, the outer die barrel to reset;

driving, by the second moving device, the inner die rod to reset; and driving, by the injection molding machine, the support base plate to reset and fit with the stationary mold plate through the movable mold base plate under an action of the at least one guide pillar; and at the same time, pushing, by the at least one reset guide rod, the push plate to an original position to complete clamping between the upper core mold and the lower core mold for next injection molding.

\* \* \* \* \*